United States Patent
Zhang

(10) Patent No.: US 12,395,861 B2
(45) Date of Patent: Aug. 19, 2025

(54) METHODS AND APPARATUS FOR REDUCING OVERHEAD IN A RANDOM ACCESS PROCEDURE

(71) Applicant: ZTE Corporation, Shenzhen (CN)

(72) Inventor: Li Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 437 days.

(21) Appl. No.: 17/680,936

(22) Filed: Feb. 25, 2022

(65) Prior Publication Data

US 2022/0182877 A1 Jun. 9, 2022

Related U.S. Application Data

(63) Continuation of application No. PCT/CN2019/102954, filed on Aug. 28, 2019.

(51) Int. Cl.
| | |
|---|---|
| *H04W 74/0833* | (2024.01) |
| *H04W 24/00* | (2009.01) |
| *H04W 74/00* | (2009.01) |

(52) U.S. Cl.
CPC ....... *H04W 74/0833* (2013.01); *H04W 24/00* (2013.01); *H04W 74/002* (2013.01)

(58) Field of Classification Search
CPC ......... H04W 28/0289; H04W 74/0833; H04W 74/002; H04W 72/23; H04W 72/12
See application file for complete search history.

(56) References Cited

U.S. PATENT DOCUMENTS

| | | | | |
|---|---|---|---|---|
| 11,917,687 | B2 * | 2/2024 | Sahlin | H04W 16/28 |
| 2019/0029051 | A1 * | 1/2019 | Lu | H04W 74/0833 |
| 2019/0090293 | A1 * | 3/2019 | Su | H04W 8/005 |
| 2020/0146054 | A1 * | 5/2020 | Jeon | H04W 74/0833 |

(Continued)

FOREIGN PATENT DOCUMENTS

| | | | | |
|---|---|---|---|---|
| CN | 109525968 | A | 3/2019 | |
| CN | 111615211 | A * | 9/2020 | H04L 1/1607 |

(Continued)

OTHER PUBLICATIONS

OPPO, "Discussion on random access procedure in NTN, Agenda Item: 11.6.3.1", 3GPP TSG-RAN WG2 Meeting #107 R2-1909750 Prague, Czech Republic, 26rd Aug. 26-Aug. 30, 2019, Total pp. 3 (Year: 2019).*

(Continued)

*Primary Examiner* — Shah M Rahman
(74) *Attorney, Agent, or Firm* — Crowell & Moring LLP

(57) ABSTRACT

A method and apparatus for reducing overhead in a random access procedure is disclosed. In one embodiment, a method performed by a wireless communication node includes: transmitting first information to a wireless communication device; receiving a first message from the wireless communication device for an access of the wireless communication device to the wireless communication node; and transmitting a second message to the wireless communication device in response to the first message. The first information comprises information about a time offset for the wireless communication device to start monitoring for the second message after the time offset from an end of a transmission of the first message.

14 Claims, 5 Drawing Sheets

(56) References Cited

U.S. PATENT DOCUMENTS

| | | | | |
|---|---|---|---|---|
| 2020/0296635 | A1* | 9/2020 | Rastegardoost | H04W 36/0064 |
| 2020/0374928 | A1* | 11/2020 | Xiong | H04W 74/0833 |
| 2022/0150972 | A1* | 5/2022 | Turtinen | H04W 74/006 |
| 2022/0191934 | A1* | 6/2022 | Miao | H04W 74/0833 |
| 2022/0225430 | A1* | 7/2022 | Zhang | H04W 74/0833 |
| 2023/0072506 | A1* | 3/2023 | Deogun | H04W 76/11 |

FOREIGN PATENT DOCUMENTS

| | | |
|---|---|---|
| KR | 10-2017-0067725 A | 6/2017 |
| WO | WO 2016/025899 A1 | 2/2016 |
| WO | WO 2020/065469 A1 | 4/2020 |
| WO | 2020/191771 A1 | 10/2020 |

OTHER PUBLICATIONS

ETSI, "ETSI TS 136 321 V15.5.0 LTE· Evolved Universal Terrestrial' Radio Access {E-UTRA); Medium Access Control {MAC) protocol specification", 3GPP TS 36.321 version 15.5.0 Release 15, pp. 19-28, Total pp. 11 (Year: 2019).*

MediaTek Inc., "Remaining details on RACH procedure", 3GPP TSG RAN WG1 Meeting Meeting 91, r1-1719569, Reno, USA, Nov. 27-Dec. 1, 2017, Total pp. 10 (Year: 2017).*

LG Electronics Inc., "RAR window extention for multi-beam operation", 3GPP TST-RAN WG2 NR AH, R2-1800567 (Resubmission of R2-1711608), Vancouver, Canada, Jan. 22-Jan. 26, 2018 (Resubmission of R2-1711608), Total pp. 2 (Year: 2018).*

International Search Report and Written Opinion of International Searching Authority for International Patent Application No. PCT/CN2019/102954 dated Jun. 2, 2020, 6 pgs.

Spreadtrum Communications, "Considerations on 2-step RACH procedure", R1-1906367, 3GPP TSG TAN WG1 Meeting #97, May 17, 2019, sections 1-3, 5.

Zte et al., "On 2-Step RACH Procedures", R1-1903879, 3GPP TSG RAN WG1 Meeting #96bis, Apr. 12, 2019, sections 1-5.

VIVO, "Discussion on 2-step RACH procedure", R1-1906125, 3GPP TSG RAN WG1 #97, May 17, 2019, sections 1-3.

Extended European Search Report for European Patent Application No. 19943026.5 dated Jul. 20, 2022, 12 pages.

Zte et al., "Report of Email Discussion [106#70] [NR/NTN] RACH capacity/procedures", 3GPP TSG-RAN WG2 Meeting #107, R2-1909256, Prague, Czech, Aug. 26-30, 2019, (Aug. 15, 2019), XP051767060, Retrieved from the Internet on Aug. 15, 2019, URL:http://www.3gpp.org/ftp/tsg_ran/WG2_RL2/TSGR2_107/Docs/R2-1909256.zip, 38 pages.

Huawei et al., "Random access without location information",3GPP TSG-RAN WG2 Meeting 107, R2-1911233, Prague, Czech Republic, Aug. 26-30, 2019, XP051768993, Retrieved from the Internet on: Aug. 16, 2019, URL:http://www.3gpp.org/ftp/tsg_ran/WG2_RL2/TSGR2_107/Docs/R2-1911233.zip, 4 pages.

Search Report and Written Opinion for Singapore Patent Application No. 11202201591P dated Jul. 29, 2024, 9 pages.

Office Action issued in related Chinese Patent Application No. 201980099895.X dated Aug. 27, 2024 w/English translation, 23 pages.

Korean-language Office Action issued in Korean Application No. 10-2022-7010147 dated Mar. 17, 2025 with English translation (14 pages).

Communication pursuant to Article issued in European Patent Application No. 19 943 026.5 dated Mar. 20, 2025, 8 pages.

Intel Corporation, "Issues related to random access procedure", 3GPP, R2-1909570, Aug. 26, 2019, 4 pages.

Ericsson, "New RAR formats for 2-step RA" 3GPP, R2-1909932, Aug. 26, 2019, 5 pages.

* cited by examiner

METHODS AND APPARATUS FOR REDUCING OVERHEAD IN A RANDOM ACCESS PROCEDURE

CROSS-REFERENCE TO RELATED APPLICATION

This application is a continuation application of PCT International Patent Application No. PCT/CN2019/102954, filed with the China National Intellectual Property Administration, PRC on Aug. 28, 2019, which is herein incorporated by reference in its entirety.

TECHNICAL FIELD

This disclosure relates generally to wireless communications and, more particularly, to methods and apparatus for reducing overhead in a random access procedure of a wireless communication.

BACKGROUND

Over the past few decades, mobile communications have evolved from voice services to high-speed broadband data services. With further development of new types of services and applications, e.g., enhanced mobile broadband (eMBB), massive Machine-Type Communication (mMTC), Ultra Reliability Low Latency Communication (URLLC), etc., the demands for high-performance data transmission on mobile networks will continue to increase exponentially. Based on specific requirements in these emerging services, wireless communication systems should meet a variety of requirements, such as throughput, latency, data rate, capacity, reliability, link density, cost, energy consumption, complexity, and coverage.

SUMMARY OF THE INVENTION

The exemplary embodiments disclosed herein are directed to solving the issues related to one or more problems presented in the prior art, as well as providing additional features that will become readily apparent by reference to the following detailed description when taken in conjunction with the accompany drawings. In accordance with some embodiments, exemplary systems, methods, and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method performed by a wireless communication node is disclosed. The method includes: transmitting first information to a wireless communication device; receiving a first message from the wireless communication device for an access of the wireless communication device to the wireless communication node; and transmitting a second message to the wireless communication device in response to the first message. The first information comprises information about a time offset for the wireless communication device to start monitoring for the second message after the time offset from an end of a transmission of the first message.

In another embodiment, a method performed by a wireless communication device is disclosed. The method includes: receiving first information from a wireless communication node; transmitting a first message to the wireless communication node for an access of the wireless communication device to the wireless communication node; and receiving, from the wireless communication node, a second message in response to the first message. The first information comprises information about a time offset for the wireless communication device to start monitoring for the second message after the time offset from an end of transmitting the first message.

Yet in another embodiment, a computing device comprising at least one processor and a memory coupled to the processor, the at least one processor configured to carry out any method disclosed herein. Yet, in another embodiment, a non-transitory computer-readable medium having stored thereon computer-executable instructions for carrying out any method disclosed herein.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of discussion.

DETAILED DESCRIPTION OF EXEMPLARY EMBODIMENTS

Figure 1A:
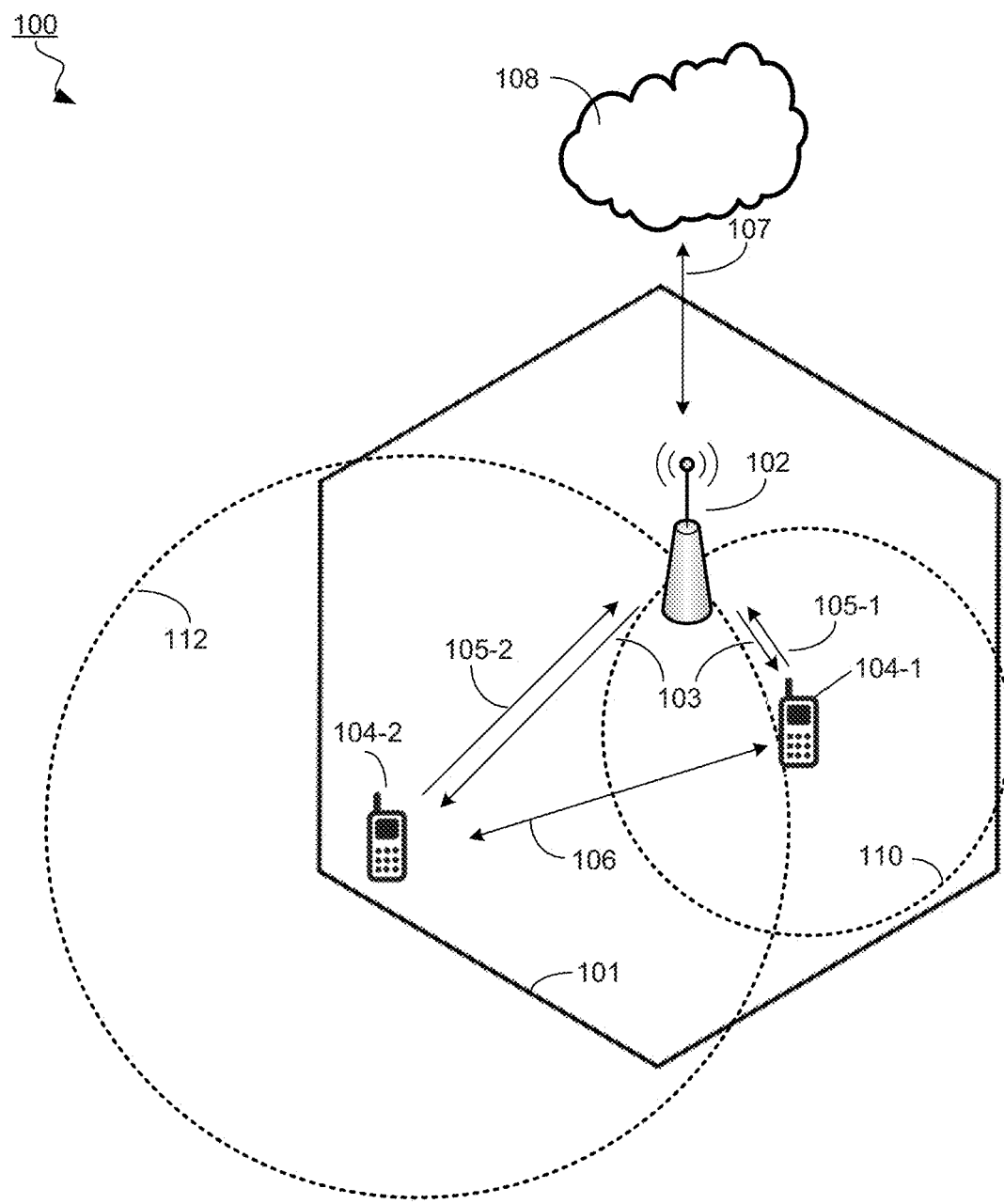
FIG. 1A illustrates an exemplary wireless communication network illustrating achievable modulation as a function of distance from a BS, in accordance with some embodiments of the present disclosure.

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described or illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Embodiments of the present invention are described in detail with reference to the accompanying drawings. The same or similar components may be designated by the same or similar reference numerals although they are illustrated in different drawings. Detailed descriptions of constructions or processes well-known in the art may be omitted to avoid obscuring the subject matter of the present invention. Further, the terms are defined in consideration of their functionality in embodiment of the present invention, and may vary according to the intention of a user or an operator, usage, etc. Therefore, the definition should be made on the basis of the overall content of the present specification.

Traditional methods which rely on random access of user terminals and scheduled data transmissions between a base station and a user terminal fail to provide satisfactory performance for the aforementioned services due to limited equipment capacity, high latency, and high signaling overhead. In order to meet these demands in 5G/NR (New Radio) communications, a grant-free data transmission method based on competition is being considered. A random access (RACH) procedure is important during initial access from RRC (radio resource control) idle, when performing a RRC connection establishment procedure, for downlink or uplink data transmission when a wireless communication device is not synchronized, and during handover when uplink synchronization is need in a target cell, etc.

To access an unlicensed spectrum during a RACH procedure, a listen-before-talk (LBT) process is required, in which a CCA (clear channel assessment) is performed. The CCA utilizes at least energy detection to determine the presence or absence of other signals on the channel in order to determine if the channel is occupied or clear, respectively. If the channel is occupied, the node enters a backoff state. In this state, a backoff timer is started and the node waits until the backoff timer expires before performing another LBT check. The backoff timer is decremented whenever there is an unoccupied slot on the medium. If the channel is clear, the node can transmit. The duration of transmission (also known as channel occupancy time or COT) is limited and is governed by the backoff parameters used to access the channel.

Such a LBT process is performed during each step of a RACH procedure when accessing an unlicensed spectrum, resulting in increased latency and disadvantageously affecting the system performance. Further, when a random access preamble is transmitted, UE will start the ra-Response Window configured in RACH-ConfigCommon at the first physical downlink control channel (PDCCH) occasion from the end of the Random Access Preamble transmission. However, a random access response (RAR) may not be received before the expiration of the ra-ResponseWindow, and the RAR reception may fail to increment RACH attempts.

The same problem also occurs when a larger cell size is supported, e.g., in a non-terrestrial network (NTN), where the beam foot print size can be up to 1000 km in diameter and leads to up to 16 millisecond (ms) maximum delay within a beam. Considering the large round trip delay (RTD) in NTN, more RACH attempts will result in increasing of access delay. The granted PUSCH will not be used since the RAR is not received, which is a waste of both RACH resource and PUSCH resource. In addition, for some scenarios, the transmission and process delay may be large. The present teaching provides some schemes to solve this issue.

The methods disclosed in the present teaching can be implemented in a wireless communication network, where a BS and a UE can communicate with each other via a communication link, e.g., via a downlink radio frame from the BS to the UE or via an uplink radio frame from the UE to the BS. In various embodiments, a BS in the present disclosure can be referred to as a network side and can include, or be implemented as, a next Generation Node B (gNB), an E-UTRAN Node B (eNB), a Transmission/Reception Point (TRP), an Access Point (AP), etc.; while a UE in the present disclosure can be referred to as a terminal and can include, or be implemented as, a mobile station (MS), a station (STA), etc. A BS and a UE may be described herein as non-limiting examples of "wireless communication nodes," and "wireless communication devices" respectively, which can practice the methods disclosed herein and may be capable of wireless and/or wired communications, in accordance with various embodiments of the present disclosure.

FIG. 1A illustrates an exemplary wireless communication network 100, in accordance with some embodiments of the present disclosure. In a wireless communication system, a network side communication node or a base station (BS) can be a node B, an E-utran Node B (also known as Evolved Node B, eNodeB or eNB), a pico station, a femto station, or the like. A terminal side node or a user equipment (UE) can be a long range communication system like a mobile phone, a smart phone, a personal digital assistant (PDA), tablet, laptop computer, or a short range communication system such as, for example a wearable device, a vehicle with a vehicular communication system and the like. A network and a terminal side communication node are represented by a BS 102 and a UE 104, respectively, which are generally referred to as "communication nodes" hereinafter in all the embodiments in this disclosure. Such communication nodes may be capable of wireless and/or wired communications, in accordance with some embodiments of the invention. It is noted that all the embodiments are merely preferred examples, and are not intended to limit the present disclosure. Accordingly, it is understood that the system may include any desired combination of UE's and BSs, while remaining within the scope of the present disclosure.

Referring to FIG. 1A, the wireless communication network 100 includes a BS 102 and a UE 104a, and a UE 104b (collectively referred to as UE's 104 herein). The BS 102 and the UE's 104 are contained within a geographic boundary of cell 101. A wireless transmission from a transmitting antenna of the UE 104 to a receiving antenna of the BS 102 is known as an uplink transmission, and a wireless transmission from a transmitting antenna of the BS 102 to a receiving antenna of the UE 104 is known as a downlink transmission. Although only 2 UE's 104 are shown in FIG. 1A, it should be noted that any number of UE's 104 can be included in the cell 101 and are within the scope of this invention. In some embodiments, the coverage of uplink communication 105b is larger than that of the uplink communication 105a, as indicated by dotted circles 112 and 110, respectively. The BS 102 is located at the intercept region of the coverage areas 110 and 112 in order for the BS 102 to perform uplink communication with the UE 104a and UE 104b in the cell 101.

The direct communication channels 105/103 between the UE's 104 and the BS 102 can be through interfaces such as an Uu interface, which is also known as UMTS (Universal Mobile Telecommunication System (UMTS) air interface. The direct communication channels (sidelink transmission) 106 between the UE's can be through a PC5 interface, which is introduced to address high moving speed and high density applications such as Vehicle-to-Vehicle (V2V) communications. The BS 102 is connected to a core network (CN) 108 through an external interface 107, e.g., an Iu interface.

The UE's 104a and 104b obtains its synchronization timing from the BS 102, which obtains its own synchronization timing from the core network 108 through an internet time service, such as a public time NTP (Network Time Protocol) server or a RNC (Radio Frequency Simulation System Network Controller) server. This is known as network-based synchronization. Alternatively, the BS 102 can also obtain synchronization timing from a Global Navigation Satellite System (GNSS) (not shown) through a satellite signal 106, especially for a large BS in a large cell which has a direct line of sight to the sky, which is known as satellite-based synchronization.

Figure 1B:
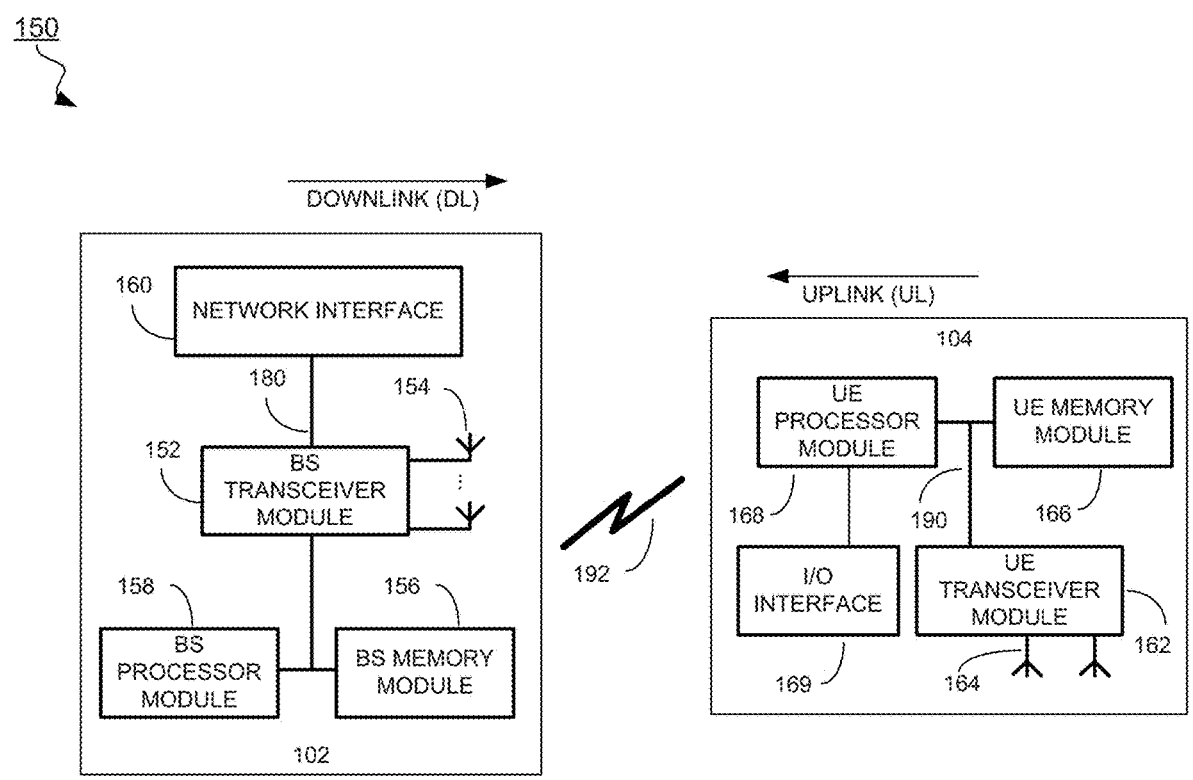
FIG. 1B illustrates a block diagram of an exemplary wireless communication system for a slot structure information indication, in accordance with some embodiments of the present disclosure.

FIG. 1B illustrates a block diagram of an exemplary wireless communication system 150, in accordance with some embodiments of the present disclosure. The system 150 may include components and elements configured to support known or conventional operating features that need not be described in detail herein. In one exemplary embodiment, system 150 can be used to transmit and receive data symbols in a wireless communication environment such as the wireless communication network 100 of FIG. 1A, as described above.

System 150 generally includes a BS 102 and two UEs 104a and 104b, collectively referred to as UE 104 below for ease of discussion. The BS 102 includes a BS transceiver module 152, a BS antenna array 154, a BS memory module 156, a BS processor module 158, and a Network interface 160, each module being coupled and interconnected with one another as necessary via a data communication bus 180. The UE 104 includes a UE transceiver module 162, a UE antenna 164, a UE memory module 166, a UE processor module 168, and an input/output (I/O) interface 169, each module being coupled and interconnected with one another as necessary via a date communication bus 190. The BS 102 communicates with the UE 104 via a communication channel 192, which can be any wireless channel or other medium known in the art suitable for transmission of data as described herein.

As would be understood by persons of ordinary skill in the art, system 150 may further include any number of blocks, modules, circuits, etc. other than those shown in FIG. 1B. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

A wireless transmission from a transmitting antenna of the UE 104 to a receiving antenna of the BS 102 is known as an uplink transmission, and a wireless transmission from a transmitting antenna of the BS 102 to a receiving antenna of the UE 104 is known as a downlink transmission. In accordance with some embodiments, a UE transceiver 162 may be referred to herein as an "uplink" transceiver 162 that includes a RF transmitter and receiver circuitry that are each coupled to the UE antenna 164. A duplex switch (not shown) may alternatively couple the uplink transmitter or receiver to the uplink antenna in time duplex fashion. Similarly, in accordance with some embodiments, the BS transceiver 152 may be referred to herein as a "downlink" transceiver 152 that includes RF transmitter and receiver circuitry that are each coupled to the antenna array 154. A downlink duplex switch may alternatively couple the downlink transmitter or receiver to the downlink antenna array 154 in time duplex fashion. The operations of the two transceivers 152 and 162 are coordinated in time such that the uplink receiver is coupled to the uplink UE antenna 164 for reception of transmissions over the wireless communication channel 192 at the same time that the downlink transmitter is coupled to the downlink antenna array 154. Preferably, there is close synchronization timing with only a minimal guard time between changes in duplex direction. The UE transceiver 162 communicates through the UE antenna 164 with the BS 102 via the wireless communication channel 192 or with other UEs via the wireless communication channel 193. The wireless communication channel 193 can be any wireless channel or other medium known in the art suitable for sidelink transmission of data as described herein.

The UE transceiver 162 and the BS transceiver 152 are configured to communicate via the wireless data communication channel 192, and cooperate with a suitably configured RF antenna arrangement 154/164 that can support a particular wireless communication protocol and modulation scheme. In some embodiments, the BS transceiver 152 is configured to transmit the physical downlink control channel (PDCCH) and configured slot structure related information (SFI) entry set to the UE transceiver 162. In some embodiments, the UE transceiver 162 is configured to receive PDCCH containing at least one SFI field from the BS transceiver 152. In some exemplary embodiments, the UE transceiver 162 and the BS transceiver 152 are configured to support industry standards such as the Long Term Evolution (LTE) and emerging 5G standards, and the like. It is understood, however, that the invention is not necessarily limited in application to a particular standard and associated protocols. Rather, the UE transceiver 162 and the BS transceiver 152 may be configured to support alternate, or additional, wireless data communication protocols, including future standards or variations thereof.

The BS processor modules 158 and UE processor modules 168 are implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Then the UE processor module 168 detects the PHR triggering message on the UE transceiver module 162, the UE processor module 168 is further configured to determine at least one second SFI entry set based on at least one predefined algorithm and the received at least one first SFI entry set configured by the BS 102, wherein the at least one predefined algorithm is selected based on other parameters calculated or messages received. The UE processor module 168 is further configured to generate the at least one second SFI entry set and monitor the PDCCH received on the UE transceiver module 162 to further receive the at least one SFI field. As used herein, "SFI entry set" means SFI table or SFI entries.

Furthermore, the steps of a method or algorithm described in connection with the embodiments disclosed herein may be embodied directly in hardware, in firmware, in a software module executed by processor modules 158 and 168, respectively, or in any practical combination thereof. The memory modules 156 and 166 may be realized as RAM memory, flash memory, ROM memory, EPROM memory, EEPROM memory, registers, a hard disk, a removable disk, a CD-ROM, or any other form of storage medium known in the art. In this regard, the memory modules 156 and 166 may be coupled to the processor modules 158 and 168, respectively, such that the processors modules 158 and 168 can read information from, and write information to, memory modules 156 and 166, respectively. The memory modules 156 and 166 may also be integrated into their respective processor modules 158 and 168. In some embodiments, the memory modules 156 and 166 may each include a cache memory for storing temporary variables or other intermediate information during execution of instructions to be executed by processor modules 158 and 168, respectively. Memory modules 156 and 166 may also each include non-volatile memory for storing instructions to be executed by the processor modules 158 and 168, respectively.

The network interface 160 generally represents the hardware, software, firmware, processing logic, and/or other components of the base station 102 that enable bi-directional communication between BS transceiver 152 and other network components and communication nodes configured to communication with the BS 102. For example, network interface 160 may be configured to support internet or WiMAX traffic. In a typical deployment, without limitation, network interface 160 provides an 802.3 Ethernet interface such that BS transceiver 152 can communicate with a conventional Ethernet based computer network. In this manner, the network interface 160 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 160 could allow the BS 102 to communicate with other BSs or core network over a wired or wireless connection.

Referring again to FIG. 1A, as mentioned above, the BS 102 repeatedly broadcasts system information associated with the BS 102 to one or more UEs (e.g., 104) so as to allow the UE 104 to access the network within the cell 101 where the BS 102 is located, and in general, to operate properly within the cell 101. The access may be associated with at least one of: a handover process; an uplink synchronization process; and a beam failure recovery process. Plural information such as, for example, downlink and uplink cell bandwidths, downlink and uplink configuration, configuration for random access, etc., can be included in the system information, which will be discussed in further detail below. Typically, the BS 102 broadcasts a first signal carrying some major system information, for example, configuration of the cell 101 through a PBCH (Physical Broadcast Channel). For purposes of clarity of illustration, such a broadcasted first signal is herein referred to as "first broadcast signal." It is noted that the BS 102 may subsequently broadcast one or more signals carrying some other system information through respective channels (e.g., a Physical Downlink Shared Channel (PDSCH)), which are herein referred to as "second broadcast signal," "third broadcast signal," and so on.

Referring again to FIG. 1B, in some embodiments, the major system information carried by the first broadcast signal may be transmitted by the BS 102 in a symbol format via the communication channel 192. In accordance with some embodiments, an original form of the major system information may be presented as one or more sequences of digital bits and the one or more sequences of digital bits may be processed through plural steps (e.g., coding, scrambling, modulation, mapping steps, etc.), all of which can be processed by the BS processor module 158, to become the first broadcast signal. Similarly, when the UE 104 receives the first broadcast signal (in the symbol format) using the UE transceiver 162, in accordance with some embodiments, the UE processor module 168 may perform plural steps (de-mapping, demodulation, decoding steps, etc.) to estimate the major system information such as, for example, bit locations, bit numbers, etc., of the bits of the major system information. The UE processor module 168 is also coupled to the I/O interface 169, which provides the UE 104 with the ability to connect to other devices such as computers. The I/O interface 169 is the communication path between these accessories and the UE processor module 168.

In some embodiments, the UE 104 can operate in a hybrid communication network in which the UE communicates with the BS 102, and with other UEs, e.g., between 104a and 104b. As described in further detail below, the UE 104 supports sidelink communications with other UE's as well as downlink/uplink communications between the BS 102 and the UE 104. As discussed above, sidelink communication allows the UEs 104a and 104b to establish a direct communication link with each other, or with other UEs from different cells, without requiring the BS 102 to relay data between UE's.

Figure 2:
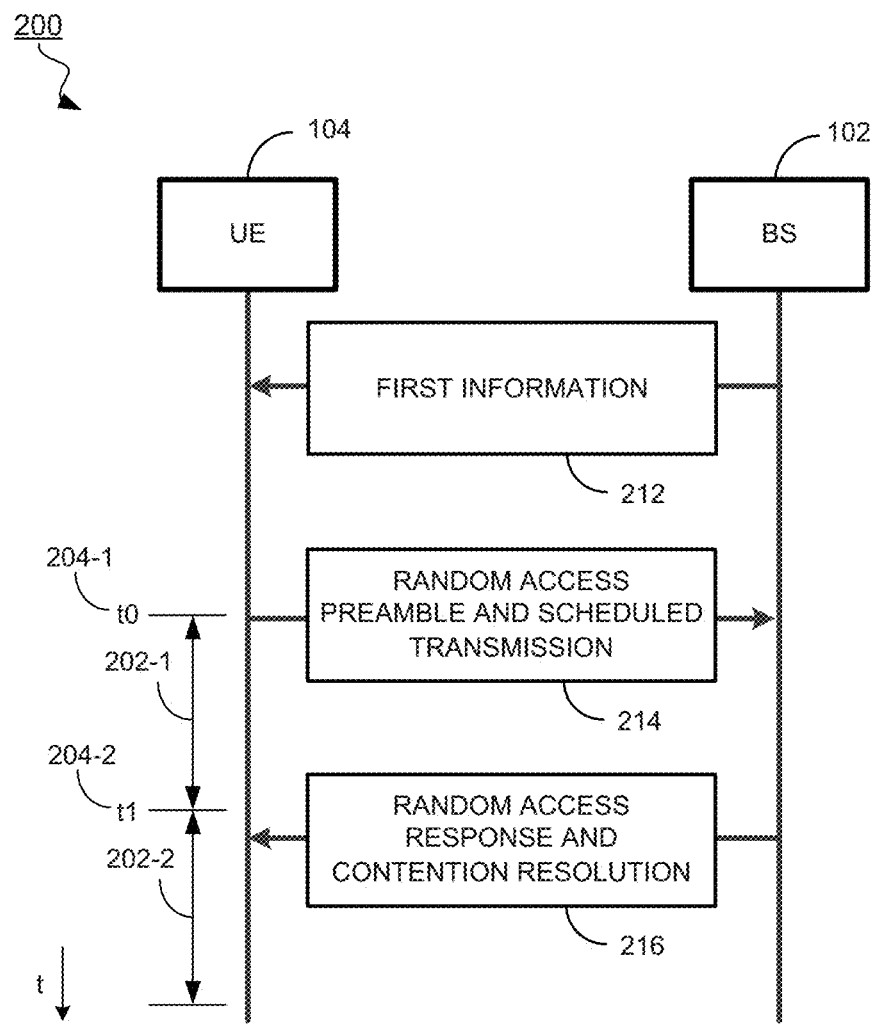
FIG. 2 illustrates a method of performing a 2-step contention-based Random Access (RACH) procedure in a wireless communication system, according to some embodiments of the present disclosure.

FIG. 2 illustrates a method 200 of performing a 2-step contention-based Random Access (RACH) procedure in a wireless communication system, according to some embodiments of the present disclosure. In the illustrated embodiment, the wireless communication system comprises a BS 102 and a UE 104. It is understood that additional operations may be provided before, during, and after the method 200 of FIG. 2, and that some other operations may be omitted or only briefly described herein. It should be noted FIG. 2 is an example for illustration and discussion purposes.

The method 200 starts with operation 212 in which the UE 104 receives first information from the BS 102 according to some embodiments. Then at operation 214, the UE 104 transmits a first message including a random access preamble and scheduled transmission to the BS 102 for an access of the UE 104 to the BS 102. At operation 216, the BS 102 transmits a second message including a random access (RA) response and contention resolution to the UE 104, in response to the first message. For the 2-step RACH, the first message may be referred to as msgA; and the second message may be referred to as msgB.

In some embodiments, the first information comprises information about a time offset for the UE 104 to start monitoring for the second message after the time offset from an end of a transmission of the first message. In some embodiments, the first information further comprises information about a time window configured for the UE 104 to monitor for the second message within the time window. The time window starts after the time offset from the end of the transmission of the first message. In some embodiments, the first information is transmitted in at least one of the following: system information and a Radio Resource Control (RRC) message. In some embodiments, the first information further comprises at least one Search Space (SS) and at least one Control Resource Set (CORESET). In some embodiments, the at least one SS and the at least one CORESET provides information of resources in the time and frequency domain for receiving Downlink Control Information (DCI) on a Physical Downlink Control Channel (PDCCH) in a RA response by the UE 104 from the BS 102. In some embodiments, RACH configurations, e.g., random access preamble format, transmission timing, and PRACH index, are also configured to the UE 104 through the system information or the RRC message. In some embodiments, the RA response comprises a MAC Random Access Response (RAR). In some embodiments, the DCI is transmitted on the PDCCH and the MAC RAR is transmitted on the PDSCH.

For example, a time offset 202-1 and a time window 202-2 can be configured to the UE 104 via system information or a RRC message. In some embodiments, the time window is a ra-ResponseWindow and is determined by a CORESET and by a SS. In some embodiments, the BS 102 configures the time offset 202-1 for the UE 104 after determining that a desired time window is longer than a pre-determined threshold. The desired time window may be a time window desired to be configured for the UE 104 to monitor for the second message within the desired time window starting from the end of the transmission of the first message, without a configuration of the time offset 202-1, i.e. without having the time offset 202-1. In some embodiments, the desired time window is determined at least partially based on at least one of the following: a first delay related to the transmission of the first message; and a second delay related to processing the first message. In some embodiments, the time offset 202-1 is determined at least partially based on at least one of the following: the desired time window; a first delay related to the transmission of the first message; and a second delay related to processing the first message.

Before transmitting the random access preamble to the BS 102 at operation 214, the UE 104 performs a LBT process on the selected at least one PRACH occasion. In some embodiments, the LBT process comprises sensing interference and bursty arrivals of packets through its transmitters to determine interference level and traffic loads on the uplink carrier. If the LBT process fails, the UE 104 restarts the LBT process at the following PRACH occasion on the corresponding uplink carrier until the LBT process passes (i.e., the uplink carrier is available and unoccupied). The UE 104 then starts first transmissions of random access preambles to the BS 102 on the PRACH occasion. The UE 104 starts the time offset 202-1 from t0 204-1 to t1 204-2 to stop monitoring the RA response from the BS 102 within the time offset 202-1. The t0 204-1 may be at an end of a transmission of the first message or at the start of a first PDCCH occasion.

In some embodiments, the UE 104 starts the time window 202-2 (i.e., ra-ResponseWindow) at time t1 204-2, which is an end of the time offset 202-1. The UE 104 monitors for the second message from the BS 102 within the time window 202-2. As shown in FIG. 2, the second message including the MAC RAR is received before the end of the time window (i.e., the ra-ResponseWindow) 202-2. In some other embodiments, the MAC RAR is not received before the end of the time window (i.e., the ra-ResponseWindow) 202-2, and the random access of the UE 104 fails. In some embodiments, the size of the time window 202-2 in the time domain is preconfigured by the system and transmitted to the UE 104 in the system information.

In some embodiments, a System Frame number (SFN) of a RACH occasion for transmitting the random access preamble in the first message may be used to indicate a time window to be distinguished from another time window of another UE. In some embodiments, the SFN of a RACH occasion is determined by the BS 102 according to the SFN of receiving the random access preamble. In some embodiments, the second message comprises information related to the SFN for transmitting the first message by the UE 104.

In some embodiments, the SFN can be transmitted in at least one of the following: a MAC RAR and a DCI. For example, 10 bits in a MAC RAR or DCI can be used for representing the SFN for transmitting the radio access preamble. But to reduce overhead, the 10 bits may not all be used for indicating the SFN. In some embodiments, the second message merely includes one or more least significant bits of the SFN for indicating the SFN for transmitting the first message. In some embodiments, the second message merely includes a remainder of the SFN when divided by N for indicating the SFN, wherein N is a positive integer. In some embodiments, N is equal to a positive power of 2, e.g. 2, 4, 8, etc. In some embodiments, the BS 102 configures the time offset 202-1 for the UE 104 after determining that a quantity of bits needed for indicating the SFN is larger than a pre-determined threshold. The quantity of bits needed for indicating the SFN may depend on a length of the desired time window as discussed above.

When the UE 104 receives the MAC RAR or the DCI, the UE 104 compares the SFN in the MAC RAR or the DCI with the SFN used for transmitting the random access preamble. If the SFN in the MAC RAR or the DCI received by the UE 104 from the BS 102 in the time window 202-2 matches the SFN for transmitting the random access preamble by the UE 104, and if the receiving preamble matches with the transmitted preamble in the first message, the random access response is received successfully by the UE 104. If the SFN in the MAC RAR or the DCI received by the UE 104 from the BS 102 in the time window 202-2 does not match the SFN for transmitting the random access preamble by the UE 104, the UE 104 may skip this response and continue to wait for random access response until the timer or time window expires.

Figure 3:
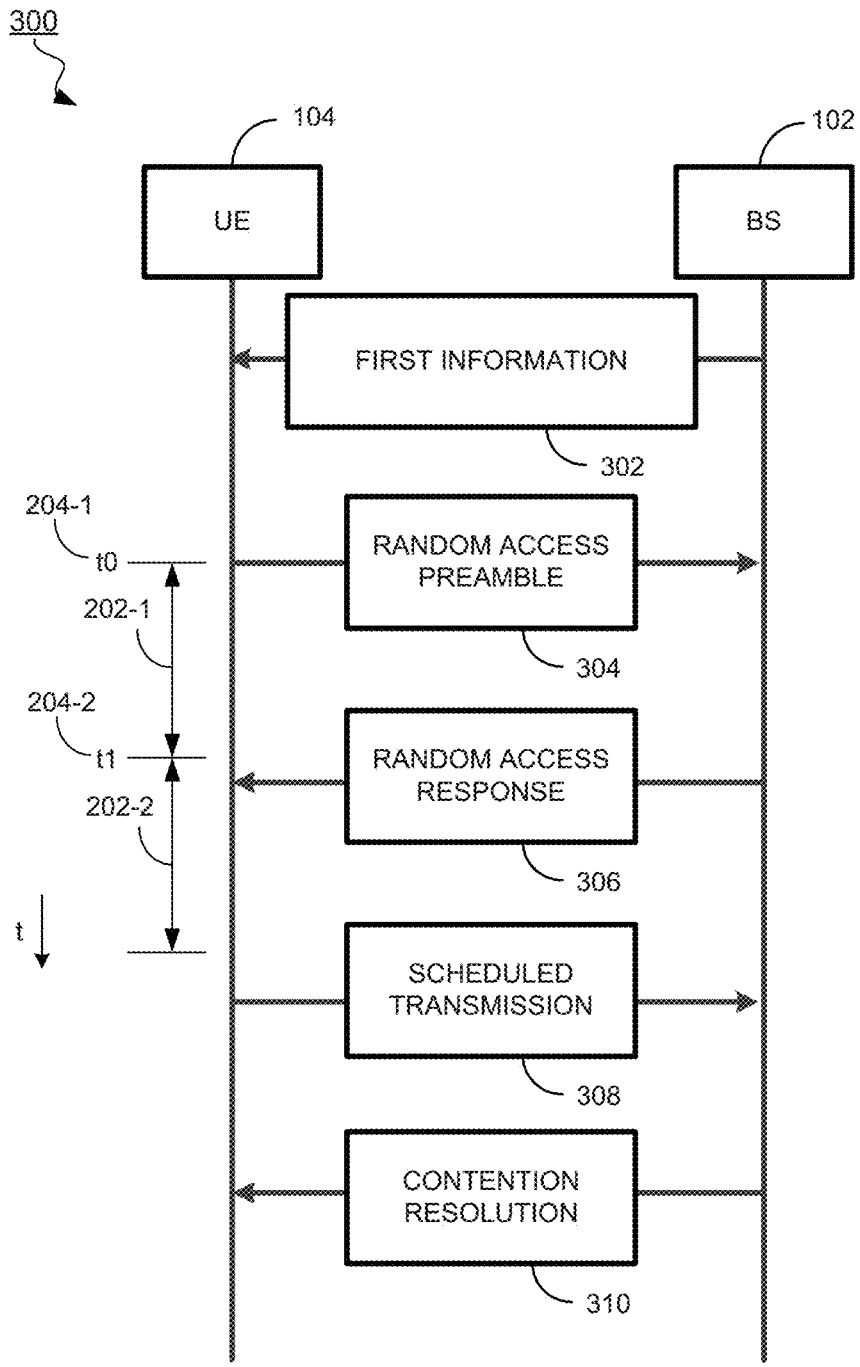
FIG. 3 illustrates a method of performing a 4-step contention-based Random Access (RACH) procedure in a wireless communication system, according to some embodiments of the present disclosure.

FIG. 3 illustrates a method 300 of performing a 4-step contention-based Random Access (RACH) procedure in a wireless communication system, according to some embodiments of the present disclosure. In the illustrated embodiment, the wireless communication system comprises a BS 102 and a UE 104. It is understood that additional operations may be provided before, during, and after the method 300 of FIG. 3, and that some other operations may be omitted or only briefly described herein. It should be noted FIG. 3 is an example for illustration and discussion purposes.

The method 300 starts with operation 302 in which the UE 104 receives first information from the BS 102 according to some embodiments. Then at operation 304, the UE 104 transmits a first message including a random access preamble to the BS 102 according to some embodiments. At operation 306, the BS 102 transmits a second message including a random access (RA) response to the UE 104, in response to the first message.

In some embodiments, the first information comprises information about a time offset for the UE 104 to start monitoring for the second message after the time offset from an end of a transmission of the first message. In some embodiments, the first information further comprises information about a time window configured for the UE 104 to monitor for the second message within the time window. The time window starts after the time offset from the end of the transmission of the first message. In some embodiments, the first information is transmitted in at least one of the following: system information and a Radio Resource Control (RRC) message. In some embodiments, the first information further comprises at least one Search Space (SS) and at least one Control Resource Set (CORESET). In some embodiments, the at least one SS and the at least one CORESET provides information of resources in the time and frequency domain for receiving Downlink Control Information (DCI) on a Physical Downlink Control Channel (PDCCH) in a RA response by the UE 104 from the BS 102. In some embodiments, RACH configurations, e.g., random access preamble format, transmission timing, and PRACH index, are also configured to the UE 104 through the system information or the RRC message. In some embodiments, the RA response comprises a MAC Random Access Response (RAR). In some embodiments, the DCI is transmitted on the PDCCH and the MAC RAR is transmitted on the PDSCH.

For example, a time offset 202-1 and a time window 202-2 can be configured to the UE 104 via system information or a RRC message. In some embodiments, the time window 202-2 is a ra-ResponseWindow and is determined by a CORESET and by a SS. In some embodiments, the BS 102 configures the time offset 202-1 for the UE 104 after determining that a desired time window is longer than a pre-determined threshold. The desired time window may be a time window desired to be configured for the UE 104 to monitor for the second message within the desired time window starting from the end of the transmission of the first message, without a configuration of the time offset 202-1, i.e. without having the time offset 202-1. In some embodiments, the desired time window is determined at least partially based on at least one of the following: a first delay related to the transmission of the first message; and a second delay related to processing the first message. In some embodiments, the time offset 202-1 is determined at least partially based on at least one of the following: the desired time window; a first delay related to the transmission of the first message; and a second delay related to processing the first message.

Before transmitting the random access preamble to the BS 102 at operation 304, the UE 104 performs a LBT process on the selected at least one PRACH occasion. In some embodiments, the LBT process comprises sensing interference and bursty arrivals of packets through its transmitters to determine interference level and traffic loads on the uplink carrier. If the LBT process fails, the UE 104 restarts the LBT process at the following PRACH occasion on the corresponding uplink carrier until either the LBT process passes (i.e., the uplink carrier is available and unoccupied) or a maximum preamble transmission number is reached. The maximum preamble transmission number may be pre-configured to the UE 104. If the maximum preamble transmission number is reached, the UE 104 may terminate the RACH procedure and switch to another procedure, e.g. a re-establishment procedure. The UE 104 then starts first transmissions of random access preambles to the BS 102 on the PRACH occasion. The UE 104 starts the time offset 202-1 from t0 204-1 to t1 204-2 to stop monitoring the RA response from the BS 102 within the time offset 202-1. The t0 204-1 may be at an end of a transmission of the first message or at the start of a first PDCCH occasion.

In some embodiments, the UE 104 starts the time window 202-2 (i.e., ra-ResponseWindow) at time t1 204-2, which is an end of the time offset 202-1. The UE 104 monitors for the second message from the BS 102 within the time window 202-2. As shown in FIG. 3, the second message including the MAC RAR is received before the end of the time window (i.e., the ra-ResponseWindow) 202-2. In some other embodiments, the MAC RAR is not received before the end of the time window (i.e., the ra-ResponseWindow) 202-2, and the random access response reception of the UE 104 fails. In some embodiments, the size of the time window 202-2 in the time domain is preconfigured by the system and transmitted to the UE 104 in the system information.

In some embodiments, a System Frame number (SFN) of a RACH occasion for transmitting the random access preamble in the first message may be used to indicate a time window to be distinguished from another time window of another UE. In some embodiments, the SFN of a RACH occasion is determined by the BS 102 according to the SFN of receiving the random access preamble. In some embodiments, the second message comprises information related to the SFN for transmitting the first message by the UE 104.

In some embodiments, the SFN can be transmitted in at least one of the following: a MAC RAR and a DCI. For example, 10 bits in a MAC RAR or DCI can be used for representing the SFN for transmitting the radio access preamble. But to reduce overhead, the 10 bits may not all be used for indicating the SFN. In some embodiments, the second message merely includes one or more least significant bits of the SFN for indicating the SFN for transmitting the first message. In some embodiments, the second message merely includes a remainder of the SFN when divided by N for indicating the SFN, wherein N is a positive integer. In some embodiments, N is equal to a positive power of 2, e.g. 2, 4, 8, etc. In some embodiments, the BS 102 configures the time offset 202-1 for the UE 104 after determining that a quantity of bits needed for indicating the SFN is larger than a pre-determined threshold. The quantity of bits needed for indicating the SFN may depend on a length of the desired time window as discussed above.

When the UE 104 receives the MAC RAR or the DCI, the UE 104 compares the SFN in the MAC RAR or the DCI with the SFN used for transmitting the random access preamble. If the SFN in the MAC RAR or the DCI received by the UE 104 from the BS 102 in the time window 202-2 matches the SFN for transmitting the random access preamble by the UE 104, the random access response is received successfully by the UE 104. If the SFN in the MAC RAR or the DCI received by the UE 104 from the BS 102 in the time window 202-2 does not match the SFN for transmitting the random access preamble by the UE 104, the random access response is failed.

After the random access response is received successfully by the UE 104 at operation 306, the method 300 continues with operation 308 in which a scheduled transmission is received by the BS 102 from the UE 104 according to some embodiments. In some embodiments, the scheduled transmission is received by the BS 102 on the PUSCH. In some embodiments, the scheduled transmission is received on resources in the time and frequency domain indicated by the MAC RAR received by the UE 104 from the BS 102.

The method 300 continues with operation 310 in which a contention-resolution message is generated and transmitted by the BS 102 to the UE 104 according to some embodiments. In some embodiments, the contention resolution message comprises random access connection setup from the BS 102. In some embodiments, the BS 102 performs a LBT process to determine the availability of the downlink carriers before transmitting the contention resolution message.

Different embodiments of the present disclosure will now be described in detail hereinafter. It is noted that the features of the embodiments and examples in the present disclosure may be combined with each other in any manner without conflict.

In some scenarios, for a RACH procedure, when the preamble is transmitted, a timer like RAR window is started. Considering the preamble transmission delay and the process delay from the network side, the timer or RAR window may be configured too large. In this case, if a current RA-RNTI formula in NR system is used, once the timer or RAR window is configured too large, it will lead to collision. In order to solve the collision, the SFN of transmitting preamble may be indicated to UE via DCI or MAC RAR. From the perspective of reducing overhead, one or more Least Significant Bits (LSBs) of SFN may be enough to indicate the SFN. However, if the window is extended too large, more bits will be needed, which increases the overhead. As such, the present teaching provides methods for combining SFN indication with a time offset before the RAR window starts. One example 400 is shown in FIG. 4.

In this example, the time offset is a constant, and may be transmitted to the UE via the system information or RRC message. For the SFN of transmitting the preamble, only one or more LSBs may be needed to indicate the SFN for reducing overhead. In an alternative way, a remainder of SFN mod N may be indicated to UE via DCI or MAC RAR, wherein N is a positive integer.

Figure 4:
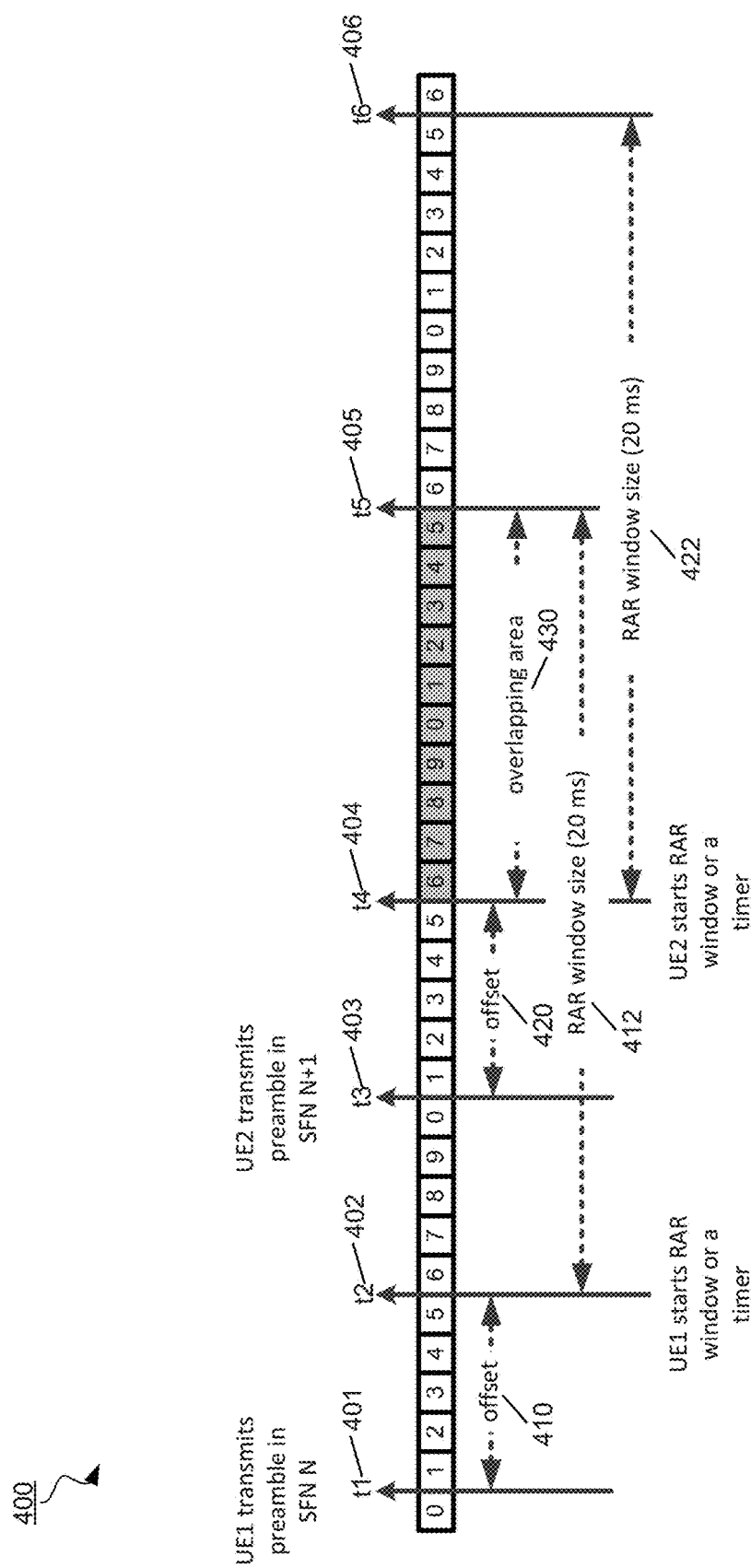
FIG. 4 illustrates an exemplary method for reducing overhead in a random access procedure, in accordance with some embodiments of the present disclosure.

As shown in FIG. 4, different UEs may start their preamble transmissions at different SFNs respectively. For example, UE1 transmits preamble in SFN N starting from time t1 401; while UE2 transmits preamble in SFN N+1 starting from time t3 403. Here, each system frame has 10 time slots, and each time slot has a length of 1 ms.

After UE1 transmits its preamble, UE1 waits for a 5 ms time offset 410 before starting the RAR window 412 (or a timer) at time t2 402. The RAR window 412 has a size of 20 ms and ends at time t5 405. Similarly, UE2 transmits its preamble, UE2 waits for a 5 ms time offset 420 before starting the RAR window 422 (or a timer) at time t4 404. The RAR window 422 has a size of 20 ms and ends at time t6 406. As shown in FIG. 4, the RAR window 412 and the RAR window 422 have an overlapping area 430. Since the BS may send back the RA response within the overlapping area 430, which causes a collision for the two RA procedures of the two UEs. In this case, the BS may use one of the two SFNs N and N+1 to indicate that the RA response is in response to which SFN and correspondingly which UE's preamble. Since a time offset is used here before each UE monitors the RA response in the RAR window, the RAR window becomes shorter, which decreases a probability and expected length of the overlapping area between two RAR windows. This in turn decreases a probability for the BS to transmit the RA response within the overlapping area, and also reduces the need of a long SFN indication, which reduces overhead in the random access procedures.

According to a first embodiment, in a 4-step RACH, a RAR window may need to be extended, considering the preamble transmission and process delay and to increase MAC RAR transmission opportunities. When the RAR window is extended, a collision is likely to occur. In order to solve the issue, SFN information about transmitting the preamble can be indicated to the UE. If the RAR window is extended larger, more bits will be indicated to UE, which increases the overhead. In this case, a time offset may be introduced, so that the RAR window does not need to be extended too large. This means that a desired longer time window can be divided into two parts: a time offset and a shorter time window. As shown in FIG. 4, a 25 ms desired time window is divided into a 5 ms time offset and a 20 ms shorter time window.

The time offset may be transmitted to the UE via the system information or RRC message. After the preamble is transmitted, the UE should make a delay of the time offset to start the RAR window at the end of the random access preamble transmission. Then, the RAR window is started at the first PDCCH occasion from the end of the time offset. Accordingly, there is no need to indicate the entire SFN. Only one or more LSBs of the SFN will be enough to distinguish different time windows and different preambles. In other words, only one or more LSBs of the SFN is indicated to the UE via DCI or MAC RAR.

According to a second embodiment, in a 2-step RACH, a timer or a RAR window may need to be extended, considering the msgA transmission and process delay and increasing msgB transmission opportunities. It can be understood that for a 2-step RACH, the timer is set up for monitoring the msgB including not only the RAR but also the contention resolution, although the term RAR window is still used here to refer to the timer. When the RAR window is extended, an RA collision is likely to occur. In order to solve the issue, SFN information about transmitting the preamble can be indicated to the UE. If the RAR window is extended larger, more bits will be indicated to UE, which increases the overhead. In this case, a time offset may be introduced, so that the RAR window does not need to be extended too large. This means that a desired longer time window can be divided into two parts: a time offset and a shorter time window. As shown in FIG. 4, a 25 ms desired time window is divided into a 5 ms time offset and a 20 ms shorter time window.

The time offset may be transmitted to the UE via the system information or RRC message. After the preamble is transmitted, the UE should make a delay of the time offset to start the RAR window at the end of the msgA transmission. Then, the RAR window is started at the first PDCCH occasion from the end of the time offset. Accordingly, there is no need to indicate the entire SFN. Only one or more LSBs of the SFN will be enough to distinguish different time windows and different preambles. In other words, only one or more LSBs of the SFN is indicated to the UE via DCI or msgB.

According to a third embodiment, in a 4-step RACH, a RAR window may need to be extended, considering the preamble transmission and process delay and increasing MAC RAR transmission opportunities. When the RAR window is extended, a collision is likely to occur. In order to solve the issue, SFN information about transmitting the preamble can be indicated to the UE. If the RAR window is extended larger, more bits will be indicated to UE, which increases the overhead. In this case, a time offset may be introduced, so that the RAR window does not need to be extended too large. This means that a desired longer time window can be divided into two parts: a time offset and a shorter time window. As shown in FIG. 4, a 25 ms desired time window is divided into a 5 ms time offset and a 20 ms shorter time window.

The time offset may be transmitted to the UE via the system information or RRC message. After the preamble is transmitted, the UE should make a delay of the time offset to start the RAR window at the end of the random access preamble transmission. In other words, the RAR window will be started at the first PDCCH occasion from the end of time offset.

For SFN, from the perspective of reducing overhead, the BS indicates not the entire SFN of transmitting the preamble, but only indicates the SFN mod N, which is enough to distinguish different time windows and different preambles. N may be a constant, e.g. a positive power of 2 like 2, 4, 8. The calculated value of SFN mod N is indicated to the UE via DCI or MAC RAR.

According to a fourth embodiment, in a 2-step RACH, a timer or a RAR window may need to be extended, considering the msgA transmission and process delay and increasing msgB transmission opportunities. It can be understood that for a 2-step RACH, the timer is set up for monitoring the msgB including not only the RAR but also the contention resolution, although the term RAR window is still used here to refer to the timer. When the RAR window is extended, an RA collision is likely to occur. In order to solve the issue, SFN information about transmitting the preamble can be indicated to the UE. If the RAR window is extended larger, more bits will be indicated to UE, which increases the overhead. In this case, a time offset may be introduced, so that the RAR window does not need to be extended too large. This means that a desired longer time window can be divided into two parts: a time offset and a shorter time window. As shown in FIG. 4, a 25 ms desired time window is divided into a 5 ms time offset and a 20 ms shorter time window.

The time offset may be transmitted to the UE via the system information or RRC message. After the preamble is transmitted, the UE should make a delay of the time offset to start the RAR window at the end of the msgA transmission. In other words, the RAR window will be started at the first PDCCH occasion from the end of time offset.

For SFN, from the perspective of reducing overhead, the BS indicates not the entire SFN of transmitting the preamble of msgA, but only indicates the SFN mod N, which is enough to distinguish different time windows and different preambles. N may be a constant, e.g. a positive power of 2 like 2, 4, 8. The calculated value of SFN mod N is indicated to the UE via DCI or msgB.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the some illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according to embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method performed by a wireless communication node, comprising:
   transmitting first information to a wireless communication device;
   receiving a first message from the wireless communication device for an access of the wireless communication device to the wireless communication node; and
   transmitting a second message to the wireless communication device in response to the first message, the second message carrying at least one of: one or more least significant bits of a System Frame Number (SFN) indicating a system frame used for transmitting the first message by the wireless communication device; or a remainder of the SFN when divided by N for indicating the system frame, N being a positive integer,
   wherein the first information comprises information about 1) a time offset for the wireless communication device to start monitoring for the second message after the time offset from an end of a transmission of the first message; and 2) a Control Resource Set (CORESET) and a Search Space (SS) indicating a time window in which the wireless communication device monitors for the second message.

2. The method of claim 1, wherein:
   the first information further comprises information about a time window configured for the wireless communication device to monitor for the second message within the time window, wherein the time window starts after the time offset from the end of the transmission of the first message; and
   the first information is transmitted in at least one of the following: a system information message or a Radio Resource Control (RRC) message.

3. The method of claim 1, further comprising configuring the time offset for the wireless communication device after determining that a quantity of bits needed for indicating the SFN is larger than a pre-determined threshold.

4. The method of claim 1, further comprising configuring the time offset for the wireless communication device after determining that a desired time window is longer than a pre-determined threshold.

5. The method of claim 4, wherein:
   the desired time window is a time window desired to be configured for the wireless communication device to monitor for the second message within the desired time window starting from the end of the transmission of the first message, without a configuration of the time offset;
   the desired time window is determined at least partially based on at least one of the following:
      a first delay related to the transmission of the first message; and
      a second delay related to processing the first message; and
   the time offset is determined at least partially based on at least one of the following:
      the desired time window;
      a first delay related to the transmission of the first message; and
      a second delay related to processing the first message.

6. A method performed by a wireless communication device, comprising:
   receiving first information from a wireless communication node via at least one of: system information, or a Radio Resource Control (RRC) message;
   transmitting a first message to the wireless communication node for an access of the wireless communication device to the wireless communication node; and
   receiving, from the wireless communication node, a second message in response to the first message, the second message carrying at least one of: one or more least significant bits of a System Frame Number (SFN) indicating a system frame usedth for transmitting the first message by the wireless communication device; or a remainder of the SFN when divided by N for indicating the system frame, N being a positive integer,
   wherein the first information comprises 1) information about a time offset for the wireless communication device to start monitoring for the second message after the time offset from an end of transmitting the first message; and 2) a Control Resource Set (CORESET) and a Search Space (SS) indicating a time window in which the wireless communication device monitors for the second message.

7. The method of claim 6, further comprising:
   monitoring for the second message within a time window, wherein the time window is indicated in the first information and starts after the time offset from the end of transmitting the first message.

8. The method of claim 6, wherein:
   the time offset is configured for the wireless communication device based on a determination that a desired time window is longer than a pre-determined threshold;
   the desired time window is a time window desired to be configured for the wireless communication device to monitor for the second message within the desired time window starting from the end of transmitting the first message, without a configuration of the time offset;

the desired time window is determined at least partially based on at least one of the following:
a first delay related to the transmission of the first message; or
a second delay related to processing the first message; and the time offset is determined at least partially based on at least one of the following:
the desired time window;
a first delay related to the transmission of the first message; or
a second delay related to processing the first message.

9. A device comprising a memory for storing computer instructions and a processor in communication with the memory, wherein the processor, when executing the computer instructions, is configured to implement a method of claim 6.

10. A wireless communication node comprising a memory for storing computer instructions and a processor in communication with the memory, wherein, when the processor executes the computer instructions, the processor is configured to cause the wireless communication node to:
transmit first information to a wireless communication device;
receive a first message from the wireless communication device for an access of the wireless communication device to the wireless communication node; and
transmit a second message to the wireless communication device in response to the first message, the second message carrying at least one of: one or more least significant bits of a System Frame Number (SFN) indicating a system frame used for transmitting the first message by the wireless communication device; or a remainder of the SFN when divided by N for indicating the system frame, N being a positive integer,
wherein the first information comprises information about 1) a time offset for the wireless communication device to start monitoring for the second message after the time offset from an end of a transmission of the first message; and 2) a Control Resource Set (CORESET) and a Search Space (SS) indicating a time window in which the wireless communication device monitors for the second message.

11. The wireless communication node of claim 10, wherein:

the first information further comprises information about a time window configured for the wireless communication device to monitor for the second message within the time window, wherein the time window starts after the time offset from the end of the transmission of the first message; and
the first information is transmitted in at least one of the following: a system information message or a Radio Resource Control (RRC) message.

12. The wireless communication node of claim 10, wherein, when the processor executes the computer instructions, the processor is configured to further cause the wireless communication node to:
configure the time offset for the wireless communication device after determining that a quantity of bits needed for indicating the SFN is larger than a pre-determined threshold.

13. The wireless communication node of claim 10, wherein, when the processor executes the computer instructions, the processor is configured to further cause the wireless communication node to:
configure the time offset for the wireless communication device after determining that a desired time window is longer than a pre-determined threshold.

14. The wireless communication node of claim 13, wherein:
the desired time window is a time window desired to be configured for the wireless communication device to monitor for the second message within the desired time window starting from the end of the transmission of the first message, without a configuration of the time offset;
the desired time window is determined at least partially based on at least one of the following:
a first delay related to the transmission of the first message; and
a second delay related to processing the first message; and the time offset is determined at least partially based on at least one of the following:
the desired time window;
a first delay related to the transmission of the first message; and
a second delay related to processing the first message.

* * * * *